United States Patent [19]

Yoshioka

[11] Patent Number: 5,558,051
[45] Date of Patent: Sep. 24, 1996

[54] VALVE TIMING CONTROL DEVICE FOR AN INTERNAL COMBUSTION ENGINE

[75] Inventor: Mamoru Yoshioka, Susono, Japan

[73] Assignee: Toyota Jidosha Kabushiki Kaisha, Aichi, Japan

[21] Appl. No.: 477,250

[22] Filed: Jun. 7, 1995

Related U.S. Application Data

[62] Division of Ser. No. 312,585, Sep. 27, 1994, Pat. No. 5,529,037.

[30] Foreign Application Priority Data

Sep. 28, 1993 [JP] Japan .................................. 5-241435

[51] Int. Cl.$^6$ ...................................................... F01L 13/00
[52] U.S. Cl. ........................ 123/90.15; 123/325; 123/493
[58] Field of Search ........................... 123/90.15, 90.16, 123/90.17, 325, 326, 493

[56] References Cited

U.S. PATENT DOCUMENTS 4,938,187  7/1990  Seki ..................................... 123/493
4,981,122  1/1991  Osawa et al. ........................ 123/325
5,233,831  8/1993  Hitomi et al. ........................ 60/284
5,293,741  3/1994  Kashiyama et al. ................. 123/90.15
5,417,191  5/1995  Togai et al. ......................... 123/90.15

FOREIGN PATENT DOCUMENTS

59-103910  6/1984  Japan .
2-298614  12/1990  Japan .

*Primary Examiner*—Weilun Lo
*Attorney, Agent, or Firm*—Kenyon & Kenyon

[57] ABSTRACT

A valve timing control device for an internal combustion engine comprises a variable valve timing mechanism capable of varying a valve overlap period. Fuel injection can be stopped in at least one predetermined engine operating condition and an optimal value of the valve overlap period in the current engine operating condition can be determined, on the basis of current engine speed, load, and temperature. The variable valve timing mechanism can be controlled such that the valve overlap period becomes larger than the optimal value when fuel injection is stopped. Accordingly, in the idle condition when the engine has not warmed up, intake air is heated sufficiently, by the valve overlap period, to more than the optimal value and an engine stall at this time is completely prevented by increasing the amount of intake air.

4 Claims, 10 Drawing Sheets

VALVE TIMING CONTROL DEVICE FOR AN INTERNAL COMBUSTION ENGINE

This application is a division of application Ser. No. 08/312,585, filed on Sep. 27, 1994, now U.S. Pat. No. 5,529,037.

BACKGROUND OF THE INVENTION

1. Field of the Invention

The present invention relates to a valve timing control device for an internal combustion engine, the device comprising a variable valve timing mechanism for controlling the valve overlap period.

2. Description of the Related Art

When the valve overlap period, during which the intake valve and the exhaust valve are opened simultaneously at the end of an exhaust stroke, is made long, the trapping efficiency and the scavenging efficiency increase so that a good engine performance can be obtained. On the other hand, in engine operating conditions under which the degree of opening of the throttle valve is relatively small so that the negative pressure in an intake port becomes high, once the valve overlap period is made long, the amount of back-flow exhaust gas into the intake port becomes large so that combustion deteriorates. Accordingly, it is desirable that the valve overlap period is varied in accordance with the engine operating condition. For this purpose, a variable valve timing mechanism capable of varying the valve overlap period has already been suggested.

According to the usual valve timing control device for controlling the valve overlap period by means of the variable valve timing mechanism, in engine operating conditions under which the degree of opening the throttle valve is relatively small, the valve overlap period is made short to prevent deterioration of combustion caused by a large amount of back-flow exhaust gas. However, Japanese Unexamined Patent Publication Nos. 59-103910 and 2-298614 disclose a valve timing control device which makes the valve overlap period long in an idle condition when the engine has not warmed up. This is intended to positively utilize the back-flow of exhaust gas, as exhaust gas recirculation, by leading a part of the exhaust gas into the intake port to reduce the amount of NOx in the exhaust gas, by lowering the combustion temperature, and to raise the intake air temperature by heating the intake port.

However, in the idle condition when the engine has not warmed up, combustion is very unstable so that the engine can stall when the amount of back-flow exhaust gas is increased. The valve timing control device disclosed in the above No. 2-298614 increases the amount of fuel and delays the ignition time to improve the combustion at this time. However, these cannot improve the combustion sufficiently so that an engine stall can still occur.

SUMMARY OF THE INVENTION

Therefore, an object of the present invention is to provide a valve timing control device for an internal combustion engine which is capable of heating the intake air sufficiently and completely preventing an engine stall when the engine has not warmed up.

According to the present invention there is provided a valve timing control device comprising a variable valve timing mechanism capable of varying the valve overlap period; increasing means capable of increasing the amount of intake air in at least the idle condition; determination means for determining the optimal value of the valve overlap period in a current engine operating condition, on the basis of current engine speed, load, and temperature; first control means for controlling the variable valve timing mechanism such that the valve overlap period becomes larger than the optimal value in an idle condition when the engine has not warmed up; and second control means for controlling the increasing means such that the amount of intake air is increased in an idle condition when the engine has not warmed up.

The present invention will be more fully understood from the description of the preferred embodiments of the invention set forth below, together with the accompanying drawings.

DESCRIPTION OF THE PREFERRED EMBODIMENTS

Figure 1:
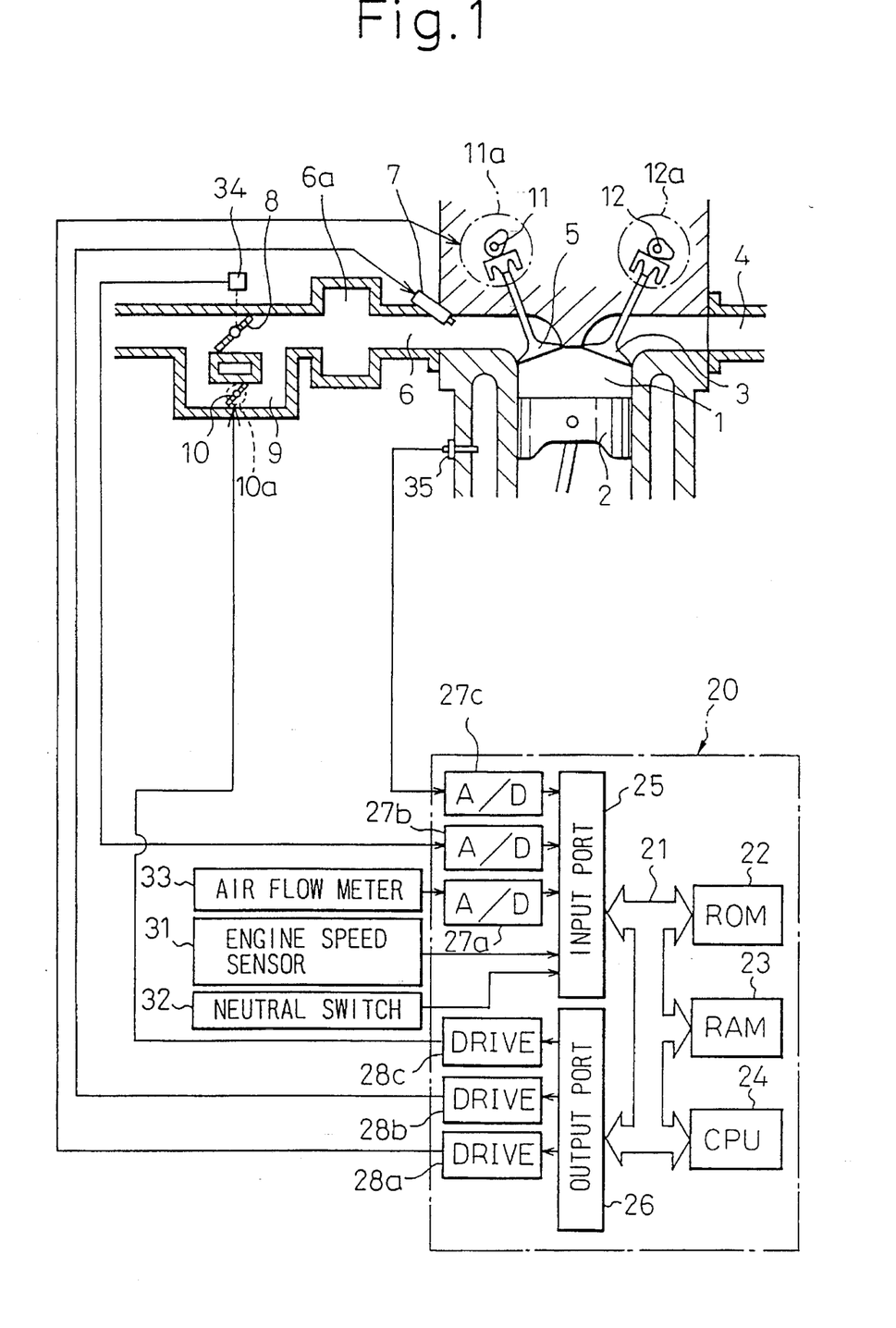
FIG. 1 is a schematic view of a valve timing control device, according to the present invention.

FIG. 1 is a schematic view of a valve timing control device, according to the present invention. In this figure, reference numeral 1 designates a combustion chamber and reference numeral 2 designates a piston. An exhaust port 4 and an intake port 6 are connected to the combustion chamber 1 via an exhaust valve 3 and an intake valve 5, respectively. A fuel injector 7 is arranged downstream from a surge tank 6a in the intake port 6. A throttle valve 8 is arranged upstream of the surge tank 6a in the intake port 6. Moreover, a bypass passage 9 which bypasses the throttle valve 8 is provided. An idle speed control valve (ISC valve) 10 which is driven by a step motor 10a is arranged in the bypass passage 9.

A pulley 11a is arranged on the end of a cam shaft 11 for the intake valve 5. The pulley 11a is driven by the crank shaft (not shown) via a belt (not shown). On the other hand, a pulley 12a is arranged on the end of a cam shaft 12 for the exhaust valve 3. The pulley 12a is driven by the pulley 11a via a belt. Accordingly, the intake valve 5 and the exhaust valve 3 are opened or closed at predetermined crank angles by the crank shaft.

The cam shaft 11 is provided with a known variable valve timing control mechanism which makes the pulley 11a rotate relative to the cam shaft 11. For example, one variable valve timing control mechanism comprises an intermediate gear which has outer and inner helical teeth, and which connects the cam shaft 11 with the pulley 11a. When the intermediate gear is moved axially by oil pressure and the like, the cam shaft 11 is rotated relative to the pulley 11a. Thus, the variable valve timing mechanism can freely vary the valve overlap period by changing the opening time of the intake valve 5 in accordance with this relative rotation angle of the cam shaft 11.

Reference numeral 20 designates an electronic control unit (ECU) for controlling the valve overlap period via the variable valve timing mechanism, the amount of fuel injected via the fuel injector 7, and the degree of opening of the ISC valve 10 via the step motor 10a. The ECU 20 is constructed as a digital computer and includes a ROM (read only memory) 22, a RAM (random access memory) 23, a CPU (microprocessor, etc.) 24, an input port 25, and an output port 26. The ROM 22, the RAM 23, the CPU 24, the input port 25, and the output port 26 are interconnected by a bidirectional bus 21.

An engine speed sensor 31 which produces an output pulse representing the engine speed is connected to the input port 25. A neutral switch 32 for detecting a neutral condition of the transmission (not shown) is connected to the input port 25. In addition, an air flow meter 33 produces an output voltage which is proportional to the amount of intake air fed into the engine cylinder, and this output voltage is input into the input port 25 via an AD converter 27a. A throttle valve sensor 34 produces an output voltage which is proportional to the degree of opening of the throttle valve 8, and this output voltage is input into the input port 25 via an AD converter 27b. A coolant temperature sensor 35 produces an output voltage which is proportional to the temperature of the cooling water of the engine as the engine temperature, and this output voltage is input into the input port 25 via an AD converter 27c. The output port 26 is connected to the variable valve timing mechanism, the fuel injector 7, and the step motor 10a for the ISC valve 10, via drive circuits 28a, 28b, 28c, respectively.

The ECU 20 controls the amount of fuel injected in accordance with the amount of intake air fed to the combustion chamber such that a desired air-fuel ratio for the current engine operating condition is realized, and carries out a fuel cut operation during deceleration when the throttle valve 8 is fully closed to save fuel and to prevent the catalytic converter from over-heating, as is well known.

Figure 2:
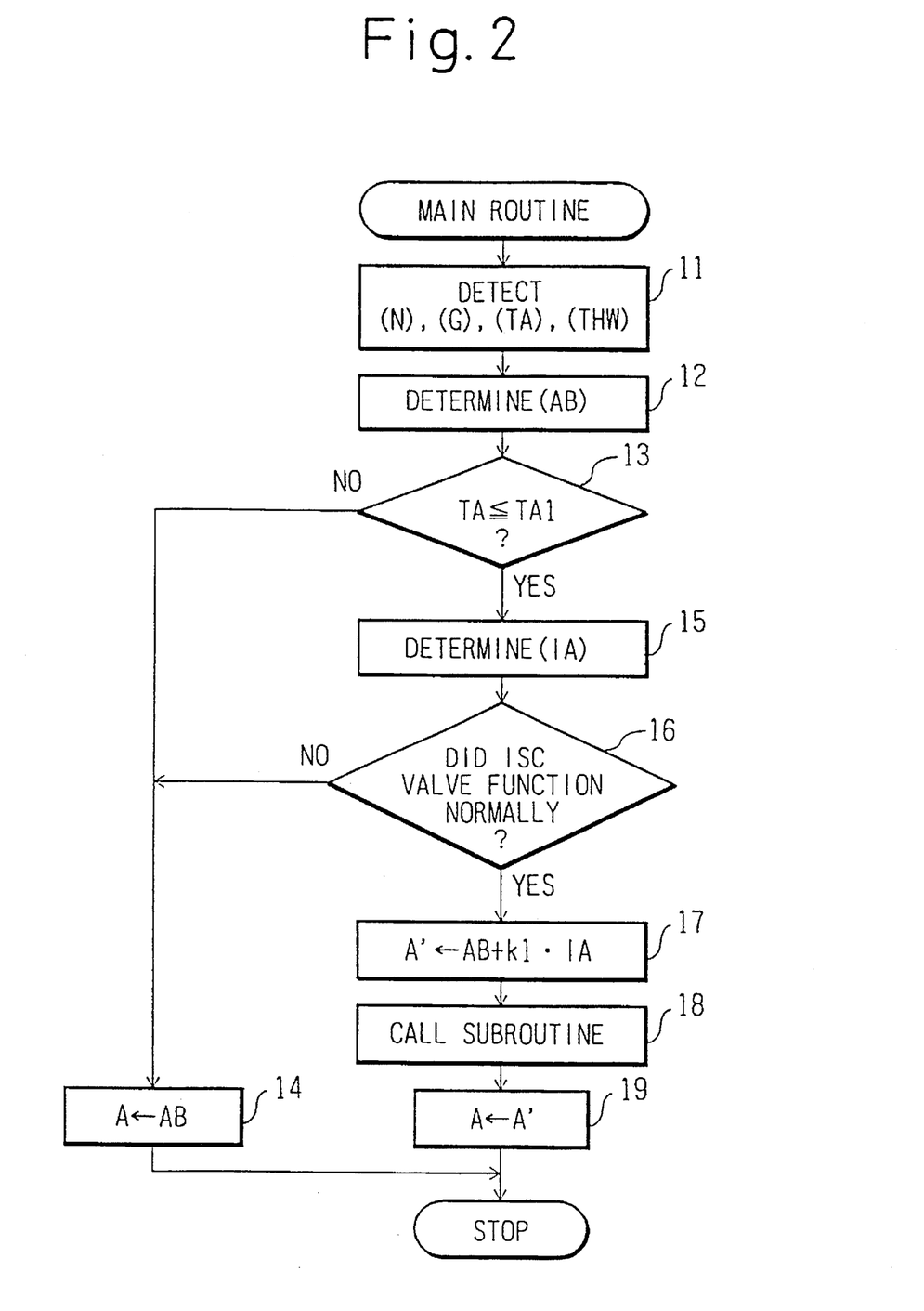
FIG. 2 is a main routine for controlling the valve overlap period via a variable valve timing mechanism by an electronic control unit.

On the other hand, the ECU 20 also controls the valve overlap period and the degree of opening of the ISC valve 10, according to a main routine shown in FIG. 2. The main routine is carried out, for example, at the end of every exhaust stroke in a certain cylinder, and is explained as follows.

First, at step 11, the current engine speed (N), the current amount of intake air fed into the engine cylinder (G), the current degree of opening of the throttle valve (TA), and the current temperature of the cooling water (THW) are detected by the sensors 31, 33, 34, 35, respectively. Next, at step 12, a basic optimal value (AB) of the valve overlap period in the current engine operating condition is determined from a map which is provided for each temperature of the cooling water (THW), on the basis of the current engine load (G/N) (an amount of intake air fed into the engine cylinder per the unit engine speed) and the current engine speed (N).

Figure 9:
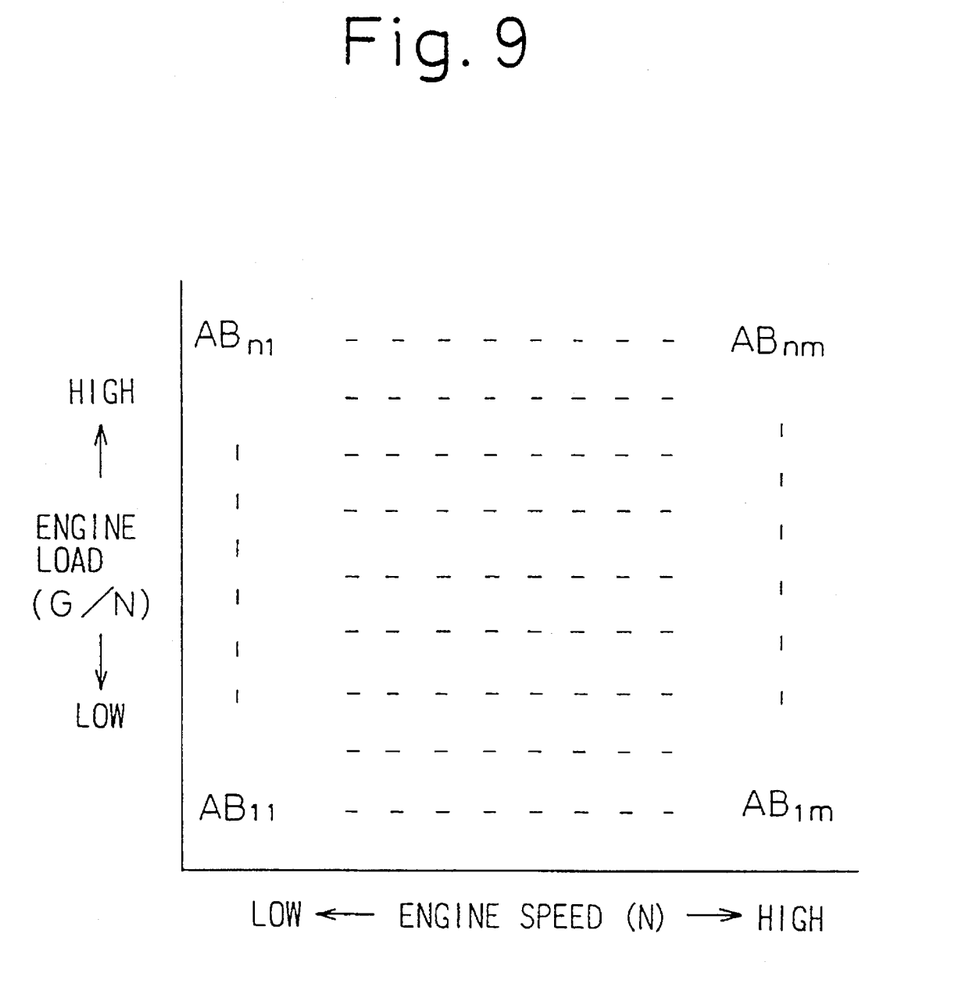
FIG. 9 is a map, at a certain temperature of the cooling water, for determining the basic optimal value of the valve overlap period (AB) used in the main routine.

The map for a certain temperature of the cooling water is shown in FIG. 9. In the map, a basic optimal value (ABnm) for each engine operating condition is written, such that the smaller the engine load (G/N) becomes, the smaller the basic optimal value (ABnm) becomes to realize stable combustion. This is because the negative pressure in an intake port at the low engine load is relatively high so that if the valve overlap period is made long, the amount of back-flow exhaust gas becomes large, and the larger the engine load (G/N) becomes, the larger the basic optimal value (ABnm) becomes, to increase the trapping efficiency and the scavenging efficiency, to take account of the current engine speed (N). On the other hand, the lower the temperature of the cooling water becomes, the smaller the basic optimal values (ABnm) become.

Next, the routine goes to step 13 and it is determined if the current degree of opening of the throttle valve (TA) is equal to or is smaller than a predetermined maximum value (TA1) which indicates an idle condition. When the result is negative, i.e., when the engine is not in an idle condition, the routine goes to step 14 and the actual valve overlap period (A) at this time is set to the basic optimal value (AB). Next, the routine is stopped.

Figure 10:
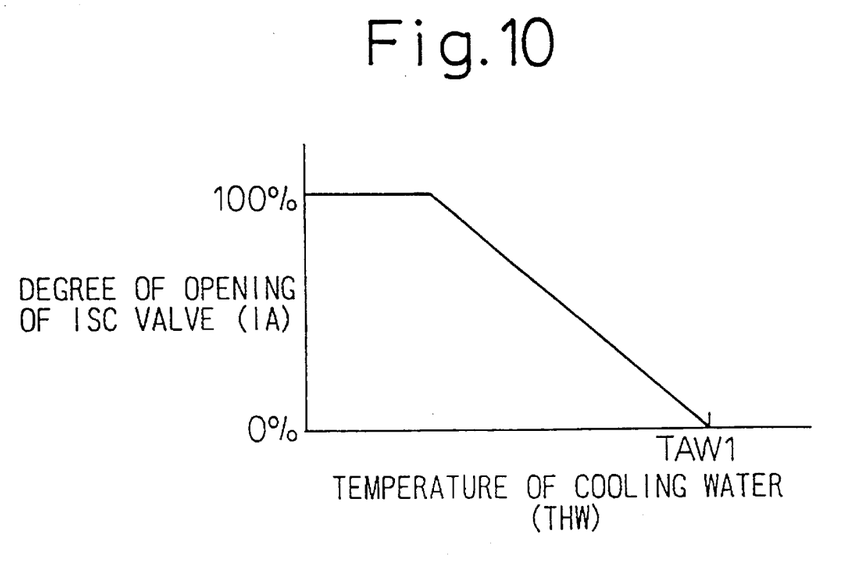
FIG. 10 is a map for determining the degree of opening the ISC valve (IA) used in the main routine.

On the other hand, when the result at step 13 is positive, i.e., when the engine is in an idle condition, the routine goes to step 15 and the degree of opening of the ISC valve 10 is determined from the map, shown in FIG. 10, on the basis of the temperature of the cooling water (THW) and the step motor 10a for the ISC valve 10 is actuated to realize the determined degree of opening.

In the map, the degree of opening of the ISC valve 10 is set such that the lower the temperature of the cooling water (THW) becomes, the larger the degree of opening of the ISC valve 10 becomes, and the degree of opening of the ISC valve 10, at the minimum temperature of the cooling water (THW1) which indicates that the engine warmed up, is set to 0% (fully closed), and the degree of opening of the ISC valve 10 at a predetermined temperature of the cooling water (THW2) which is lower than the minimum temperature (THW1) is set to 100% (fully open). Whereby, if the ISC valve 10 is moved by the step motor 10a according to the map shown in FIG. 10, the lower the temperature of the cooling water (THW) becomes, the larger the amount of intake air passing through the bypass passage 9 becomes. Therefore, the amount of intake air fed to the combustion chamber 1 increases and this causes an increase in the amount of fuel injected so that the idle engine speed becomes higher, and thus combustion at this time becomes stable and an early warm-up can be realized.

Next, the routine goes to step 16 and it is determined if the ISC valve 10 has moved according to the map shown in FIG. 10. When the result is negative, the routine goes to step 14 and the actual valve overlap period (A) is set to the basic optimal value (AB) determined at step 12. However, when the result at step 16 is positive, i.e., when the ISC valve 10 functions normally so that combustion becomes stable by increasing an amount of intake air and fuel, the routine goes to step 17 and a temporary valve overlap period (A') is calculated using the following expression (1).

$$A'=AB+k1*IA \quad (1)$$

Here, (k1) designates a predetermined coefficient. The temporary valve overlap period (A') is increased from the basic optimal value (AB) at this time, in accordance with the degree of opening of the ISC valve (IA).

Next, the routine goes to step 18 and a sub-routine for correcting the temporary valve overlap period (A') is called, which will be explained in detail. Thereafter, the routine goes to step 19 and the actual valve overlap period (A) is set to the temporary valve overlap period (A'). Next, the routine is stopped. In this manner, when the ISC valve functions normally in the idle condition, the actual valve overlap period (A) is made longer than the basic optimal value (AB). Therefore, although a back-flow of exhaust gas is caused, combustion at this time becomes stable by increasing the amount of intake air and fuel fed to the combustion chamber 1 and an engine stall does not occur. Accordingly, the back-flow of exhaust gas is utilized as exhaust gas recirculation so that the intake port 6 is heated by exhaust gas. Thus, the intake air temperature is raised so that fuel is atomized favorably at this time, even though the engine has not warmed up, and better combustion can be obtained. Moreover, by such an exhaust gas recirculation, the amount of NOx in the exhaust gas is reduced. This permits miniaturization of or omission of the heating means for heating the catalytic converter to activate the catalyst when the engine has not warmed up.

Figure 3:
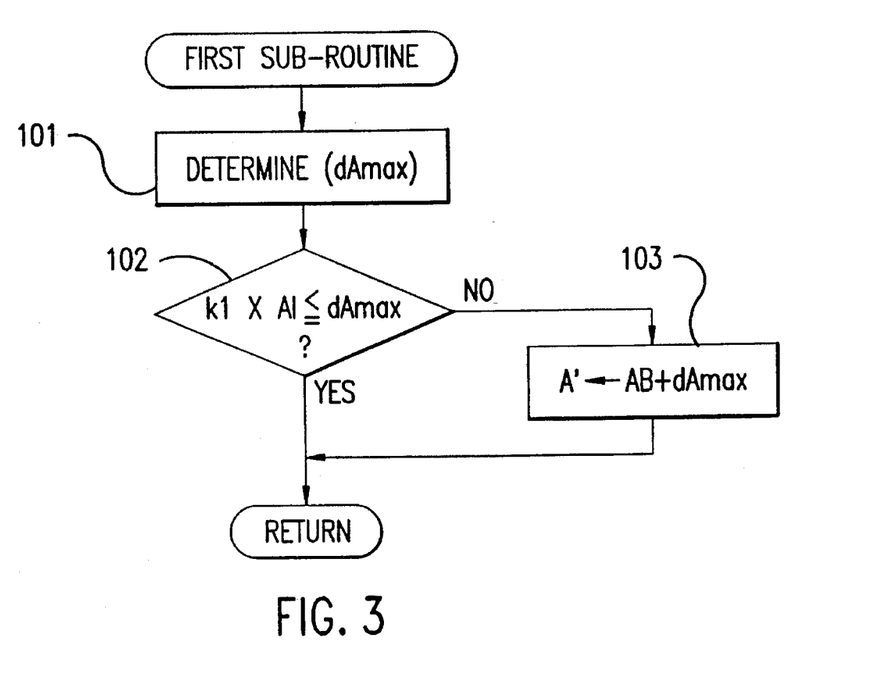
FIG. 3 is a first sub-routine used as the sub-routine called by the main routine.
Figure 11:
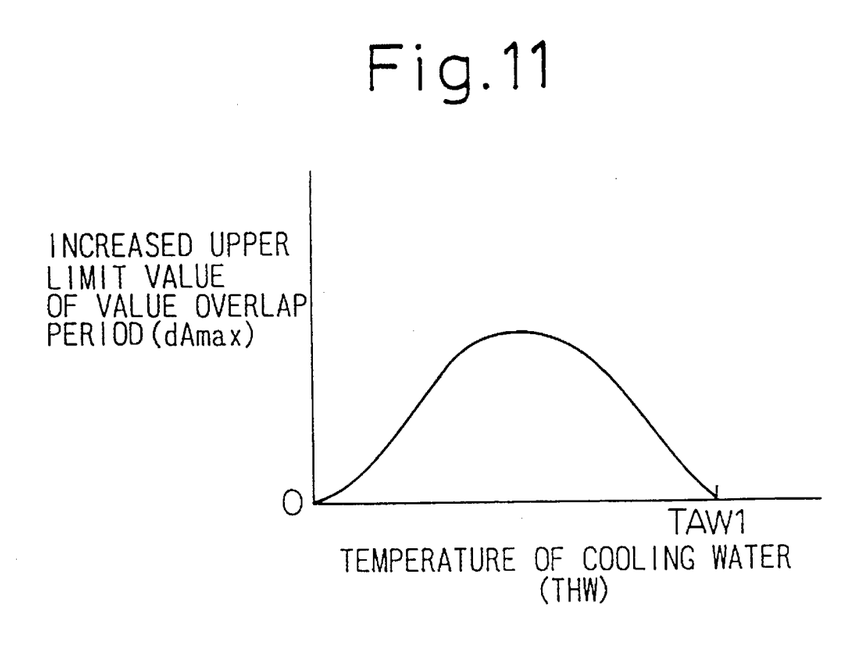
FIG. 11 is a map for determining the increased upper limit value of the valve overlap period (dAmax) used in the first sub-routine.

FIG. 3 shows a first sub-routine used as the sub-routine called at step 18 in the main routine. In the first sub-routine, at step 101, an upper limit (dAmax) of the increasing value (k1*AI) of the valve overlap period is determined using the map shown in FIG. 11, on the basis of the current temperature of the cooling water (THW). In the map, an increasing upper limit value (dAmax) is set such that when the temperature (THW) of the cooling water is higher than the ordinary temperature (20 degrees C.), the lower the temperature of the cooling water (THW) becomes, the larger the upper limit (dAmax) becomes, and when the temperature of the cooling water (THW) is lower than the ordinary temperature, the lower the temperature (THW) of the cooling water becomes, the smaller the upper limit (dAmax) becomes, and when the temperature of the cooling water (THW) is the temperature (THW1), the upper limit value (dAmax) is set to "0".

Next, the routine goes to step 102 and it is determined if the increasing value (k1*AI) in the main routine is equal to or is smaller than the upper limit (dAmax) determined at step 101. When the result is positive, the process returns to the main routine without changing the increasing value (k1*AI). On the other hand, when the result at step 102 is negative, the routine goes to step 103 and the increasing value (k1*A1) is corrected to the upper limit (dAmax). Thereafter, the process returns to the main routine and at step 19 in the main routine, the actual valve overlap period (A) is set to the temporary valve overlap period (A'=AB+dAmax) corrected by the first sub-routine. Accordingly, when the temperature of the cooling water (THW) is extremely low and the amount of intake air is increased considerably by the ISC valve 10, the actual valve overlap period (A) is not made long in accordance with the amount of intake air. As a result, when the temperature of the cooling water (THW) is extremely low so that combustion is still relative unstable even if the engine speed is made higher, the amount of back-flow exhaust gas does not increase, so that engine stalling is completely prevented, by the first sub-routine.

Figure 4:
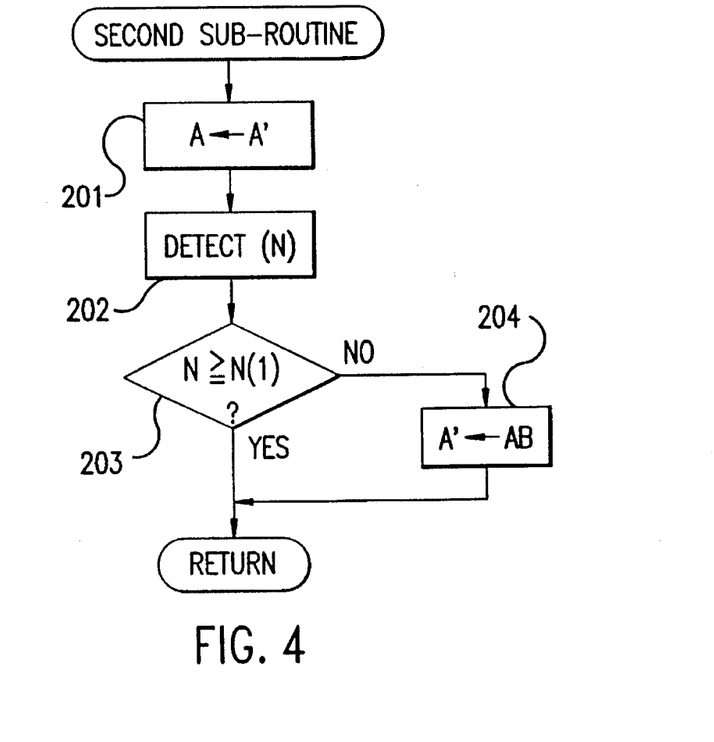
FIG. 4 is a second sub-routine used as the sub-routine called by the main routine.

FIG. 4 shows a second sub-routine used as the sub-routine called at step 18 in the main routine. In the second sub-routine, at step 201, the valve overlap period (A) is set to the temporary valve overlap period (A') calculated at step 17 in the main routine and combustion in the certain cylinder is carried out. Next, the routine goes to step 202 and an engine speed (N) during this combustion is detected by the engine speed sensor 31. Next, the routine goes to step 203 and it is determined if the engine speed (N) is equal to or is higher than a predetermined lower limit engine speed (N1) which can maintain an idle condition.

When the result is positive, the process returns to the main routine without correction of the temporary valve overlap period (A') and this valve overlap period (A') is used as the actual valve overlap period (A) in other cylinders until a new temporary valve overlap period (A') is calculated. On the other hand, when the result at step 203 is negative, the routine goes to step 204 and the temporary valve overlap period (A') is corrected to the basic optimal value (AB). Next, the process returns to the main routine. Accordingly, in the case that the temperature of the engine oil is low so that the coefficient of viscosity of the engine oil is relative large and thus the engine speed is made low by the large coefficient of viscosity of the engine oil, the actual valve overlap period (A) in other cylinders is not increased from the basic optimal value (AB) so that the engine speed becomes higher than the lower limit engine speed (N1) and thus an engine stall is prevented.

Figure 5:
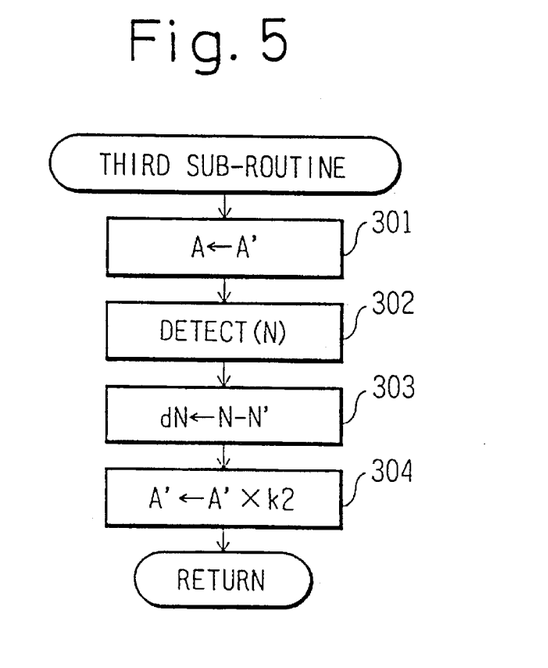
FIG. 5 is a third sub-routine used as the sub-routine called by the main routine.

FIG. 5 shows a third sub-routine used as the sub-routine called at step 18 in the main routine. In the third sub-routine, first, at step 301, the valve overlap period (A) is set to the temporary valve overlap period (A') calculated at step 17 in the main routine and combustion in the certain cylinder is carried out. Next, the routine goes to step 302 and the engine speed (N) during this combustion is detected by the engine speed sensor 31. Next, the routine goes to step 303 and a difference (dN) between the engine speed (N) and a target engine speed (N') at the current temperature of the cooling water (THW) is calculated. Next, the routine goes to step 304 and a coefficient (k2) is determined by a map shown in FIG. 12, on the basis of the difference (dN) thereafter the temporary valve overlap period (A') is multiplied by the coefficient (k2) and is made a new temporary valve overlap period (A'). Next, the process returns to the main routine.

Figure 12:
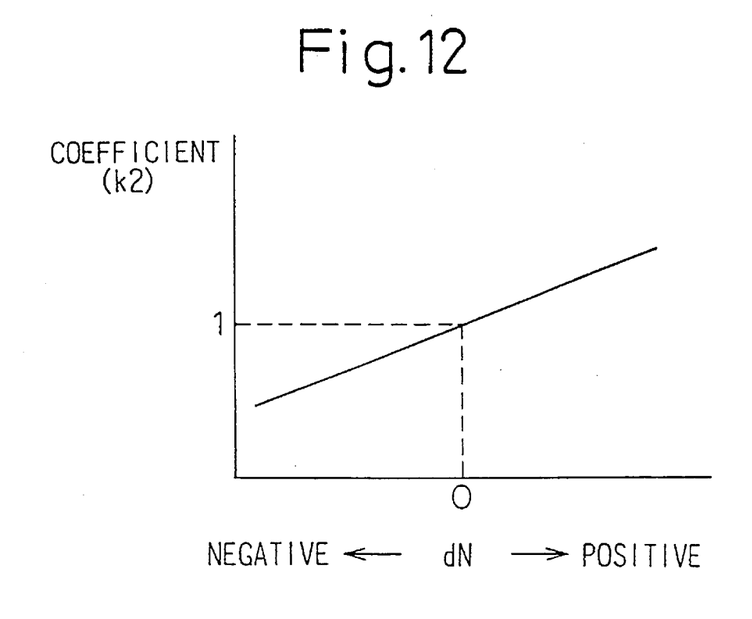
FIG. 12 is a map for determining a coefficient (k2) used in the third sub-routine.

In the map, the coefficient (k2) is set such that when the difference (dN) is "0", the coefficient (k2) is "1", and the larger the difference (dN) becomes, the larger the coefficient (k2) becomes. Accordingly, if the current engine speed (N) is higher or lower than the target engine speed (N') at this time, the actual valve overlap period is made larger or smaller in accordance with the difference (dN) so that the amount of exhaust gas recirculation is adjusted so as to realize the target engine speed (N'). Due to the correction of the valve overlap period by the third sub-routine, in addition to the effects resulting from increasing the valve overlap period as above mentioned, stable combustion in an idle condition can be certainly realized. For example, when the ISC valve 10 is fully open or fully closed and the engine speed (N) is lower or higher than the target engine speed (N'), the idle speed can not be controlled by the ISC valve 10. In this case, the third sub-routine is specially effective.

Figure 6:
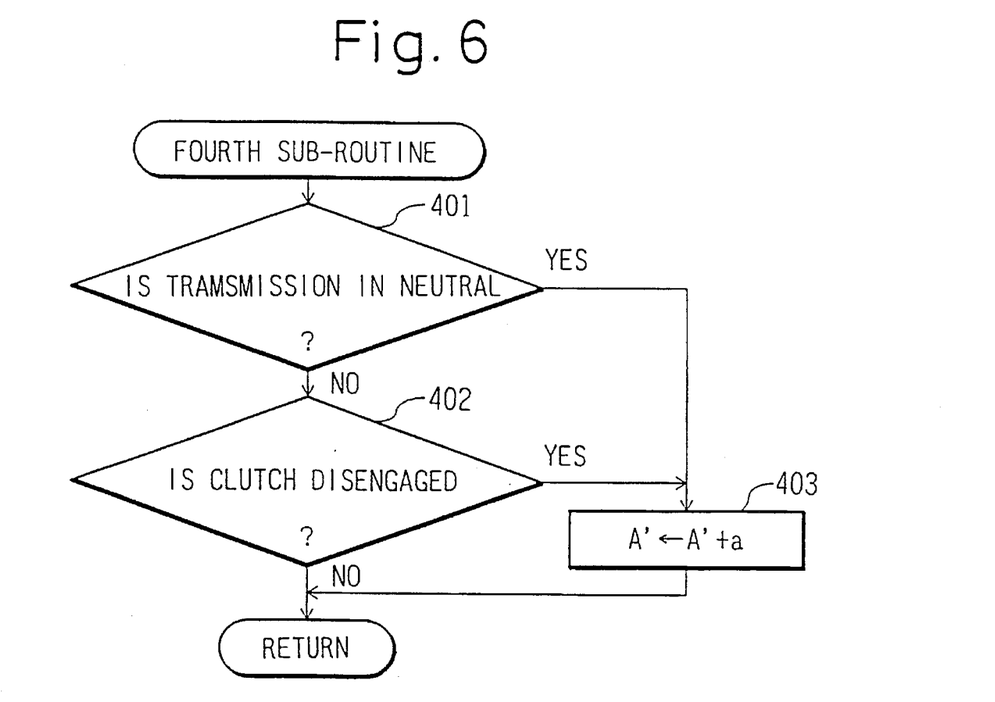
FIG. 6 is a fourth sub-routine used as the sub-routine called by the main routine.

FIG. 6 shows a fourth sub-routine used as the sub-routine called at step 18 in the main routine. In the fourth sub-routine, first, at step 401, it is determined if the engine transmission is in neutral, by using the neutral switch 32. When the result is negative, the routine goes to step 402 and it is determined if the engine clutch is disengaged. When both results are negative, i.e., the vehicle is running normally, the process returns to the main routine without correction of the temporary valve overlap period (A'). On the other hand, when the result at step 401 or 402 is positive, the routine goes to step 403, and the temporary valve overlap period (A') is added to a predetermined value (a) and is made the new temporary valve overlap period (A'). Next, the process returns to the main routine.

When the engine transmission is in neutral or the clutch is disengaged, i.e., when the engine is cut apart from the vehicle body and the vehicle is stoped, the engine vibration is not transmitted to the vehicle body via the engine drive shaft. Accordingly, in this case, if the actual valve overlap period (A) is made larger by the fourth sub-routine, in spite of the deterioration of combustion and the engine vibration, the vehicle body is hardly vibrated by the engine. As a result, the amount of NOx in the exhaust gas can be reduced and better heating of the intake air can be realized by an increase of the amount of the back-flow exhaust gas. Note that when the vehicle has an automatic transmission, step 402 in the fourth sub-routine is omitted because the vehicle is not provided with the clutch.

Figure 7:
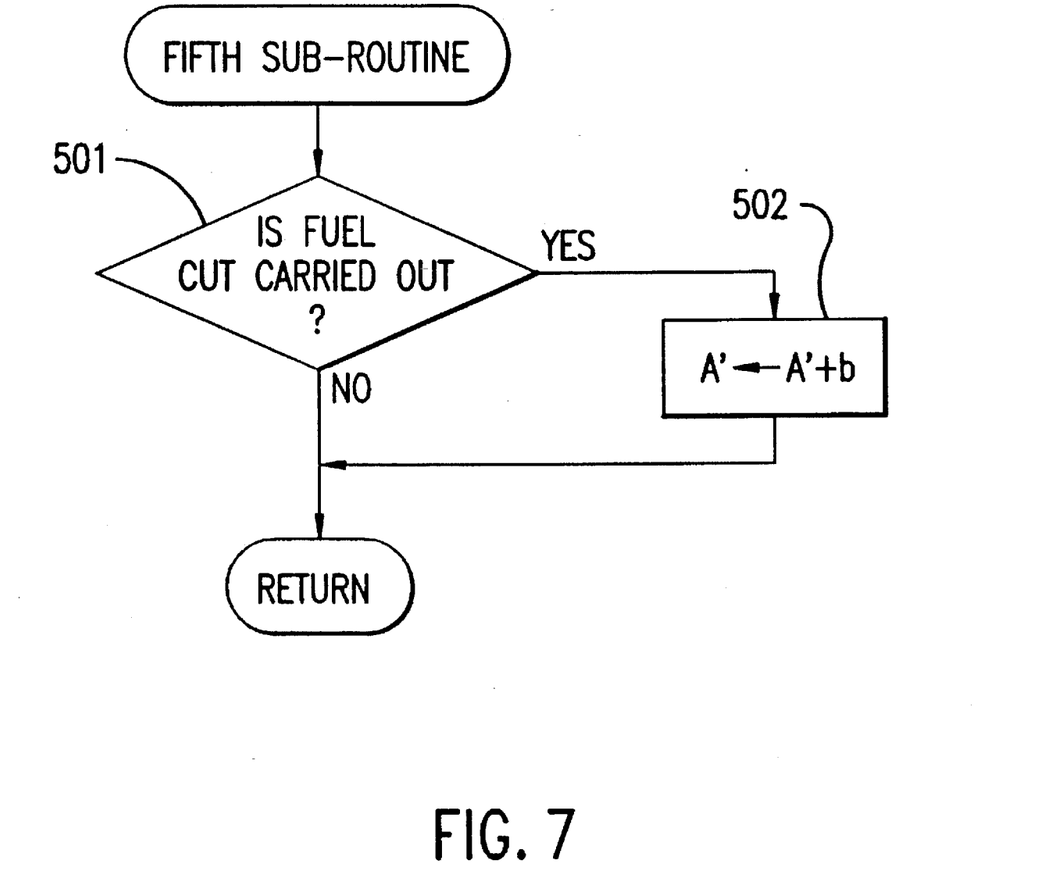
FIG. 7 is a fifth sub-routine used as the sub-routine called by the main routine.

FIG. 7 shows a fifth sub-routine used as the sub-routine called at step 18 in the main routine. In the fifth sub-routine, at step 501, it is determined if a fuel cut operation is carried out during deceleration to save fuel, and to prevent excess heating of the catalytic converter. When the result is negative, the process returns to the main routine without correction of the temporary valve overlap period (A'). On the other hand, when the result at step 501 is positive, the routine goes to step 502 and the temporary valve overlap period (A') is added to a predetermined value (b) and is made the new temporary valve overlap period (A'). Next, the process returns to the main routine.

Figure 13:
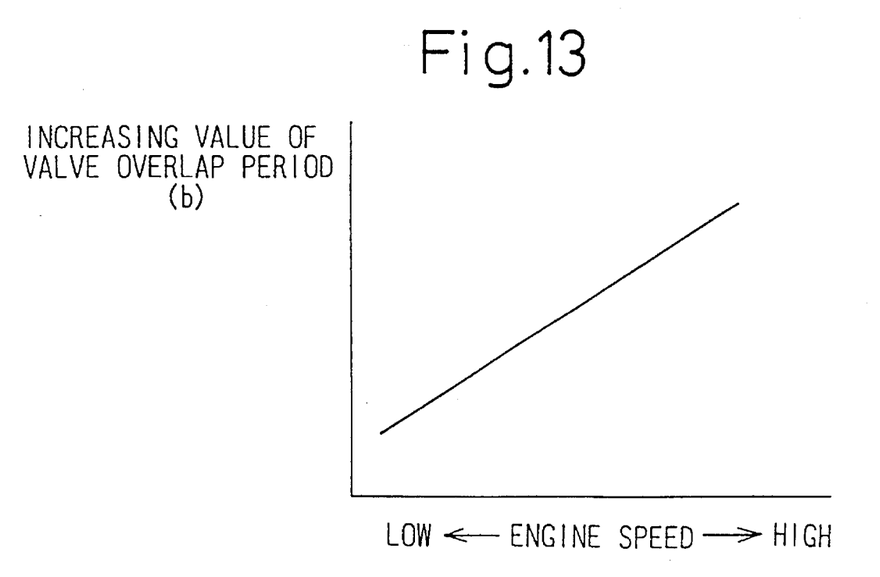
FIG. 13 is a map for determining an increased value of the valve overlap period (b) used in the fifth sub-routine.

During the fuel cut operation, combustion is not carried out and fuel is not injected. Whereby, the valve overlap period can be set at any value. Once the actual valve overlap period (A) is made larger by the fifth sub-routine, the back-flow amount of air heated in the combustion chamber 1 becomes large so that good heating of intake air is realized when the fuel injection starts again. In the fifth sub-routine, an increasing value (b) of the valve overlap period at step 502 is a constant. However, it may be a variable which is determined from the map shown in FIG. 13, on the basis of the engine speed (N) immediately before the fuel cut operation starts. In the map, the variable is set such that the higher the engine speed is, the larger the variable becomes. The higher the engine speed immediately before the fuel cut operation starts is, the higher the temperature in the combustion chamber 1 becomes. Accordingly, the actual valve overlap period (A) is made large in accordance with the engine speed immediately before the fuel cut operation starts by the fifth sub-routine so that heat of the combustion chamber 1 can be used effectively to heat the intake air.

Figure 8:
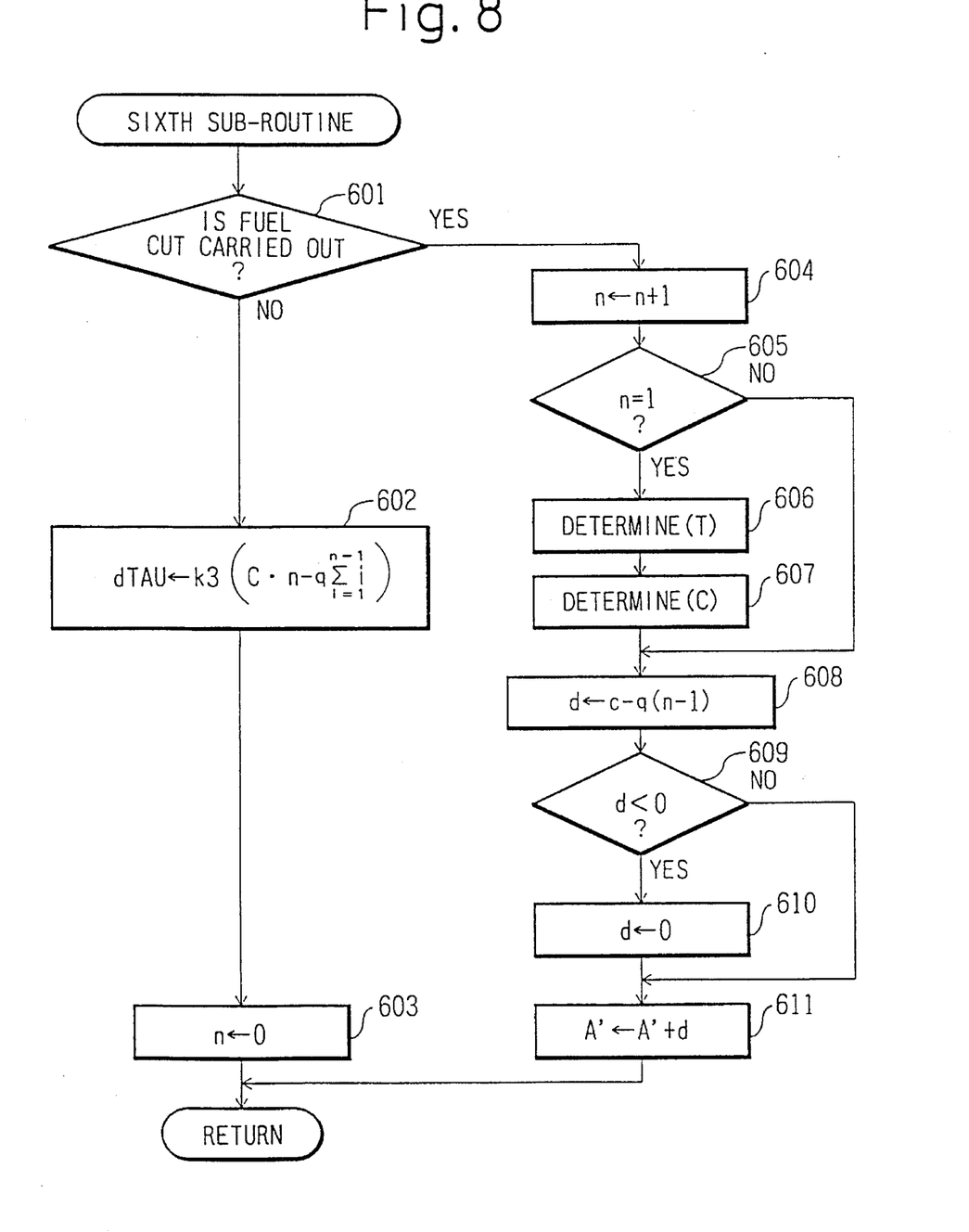
FIG. 8 is a sixth sub-routine used as the sub-routine called by the main routine.

FIG. 8 shows a sixth sub-routine used as the sub-routine called at step 18 in the main routine. In the sixth sub-routine, first, at step 601, it is determined if the fuel cut operation is carried out during deceleration, to save fuel and to prevent from excess heating of the catalytic converter. When the result is negative, the routine goes to step 602, and thereafter the routine goes to step 603 and a count value (n) is reset to "0". Next, the process returns to the main routine without correcting the temporary valve overlap period (A') determined at step 17 in the main routine. The process at step 602 is a calculation of an extra amount (dTAU) of fuel injected initially when the fuel injection starts again. The count value (n) remains "0" when the fuel is not cut, so that the extra amount (dTAU) remains at "0". The calculation is explained in detail later.

On the other hand, when the result at step 601 is positive, i.e., when the fuel cut operation is carried out, the routine goes to step 604 and the count value (n) is increased by "1". Next, the routine goes to step 605 and it is determined if the count value (n) is "1". The result is positive only immediately after the fuel cut operation starts and the routine goes to step 606. At step 606, the temperature in the combustion chamber 1 (T) is estimated. For this estimation, the amount of fuel injected and the temperature of the cooling water, immediately before the fuel cut starts can be utilized. It is understood that the temperature in the combustion chamber 1 (T) is high when the amount of fuel is large and the temperature of the cooling water is high. On the other hand, the temperature in the combustion chamber 1 (T) may be detected directly.

Figure 14:
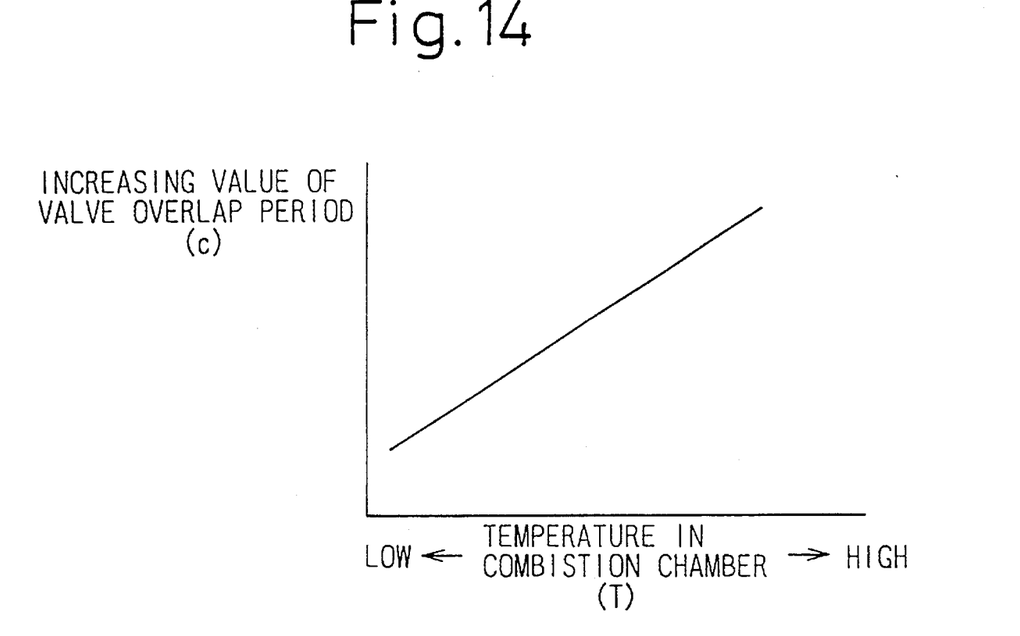
FIG. 14 is a map for determining an increased value of the valve overlap period (c) used in the sixth sub-routine.

Next, the routine goes to step 607, an increasing value of the valve overlap period (c) is determined from the map shown in FIG. 14, on the basis of the temperature in the combustion chamber 1 (T). In the map, an increasing value of the valve overlap period (c) is set such that the higher the temperature in the combustion chamber 1 (T) becomes, the larger the increasing value (c) becomes to effectively utilize the heat of the combustion chamber 1. Next, the routine goes to step 608 and a new increasing value (d) is calculated using the following expression (2), on the basis of the increasing value (c) determined at step 607.

$$d=c-q(n-1) \qquad (2)$$

Since the count value (n) is "1" at present, the new increasing value (d) is equal to the increasing value (c). However, if the fuel cut operation continues, the count value (n) is increased and the processes at steps 606 and 607 are omitted and the new increasing value (d) is decreased, by a predetermined value (q), gradually. Next, the routine goes to step 609 and it is determined if the new increasing value (d) is smaller than "0". Only when the result is positive, the routine goes to step 610 and the new increasing value (d) is made "0". Next, the routine goes to step 611, and the temporary valve overlap period (A') is added to the increasing value (d) and is made the new temporary valve overlap period (A'). Next, the process returns to the main routine.

Figure 15:
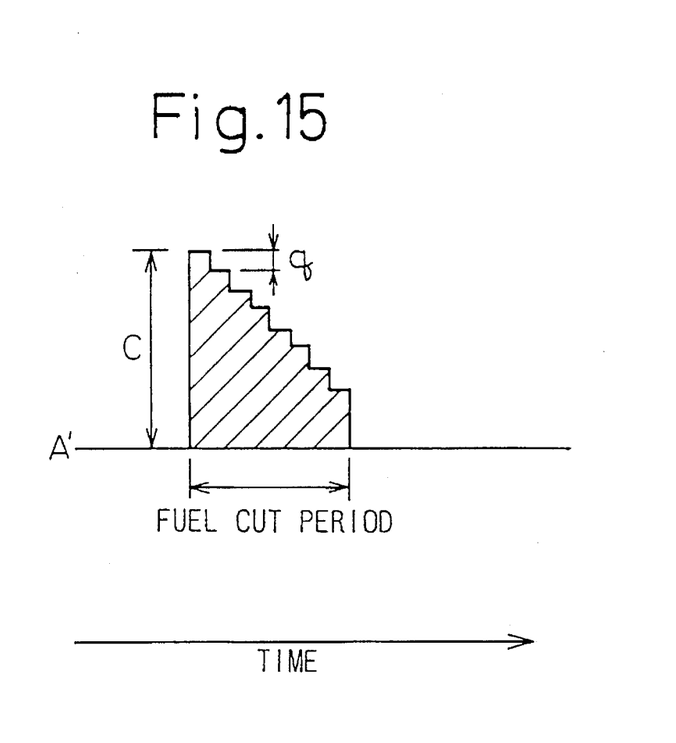
FIG. 15 is a time chart showing the variation in the valve overlap period according to the sixth sub-routine.

According to the sixth sub-routine, the actual valve overlap period (A) during a fuel cut operation is increased by the increasing value (c) determined on the basis of the temperature in the combustion chamber 1 (T) and thereafter is decreased by a predetermined value (q), as shown in FIG. 15. The temperature in the combustion chamber 1 (T) drops gradually due to the repeated back flow of intake air so that heat to the intake port can not be improved even if the valve overlap period remains long. Accordingly, the actual valve overlap period (A) is gradually decreased by the sixth sub-routine so that the difference between the valve overlap periods before and after the fuel injection starts can be made small and thus the engine torque variation at this time can be reduced.

Moreover, in the sixth sub-routine, when the fuel injection starts again after a fuel cut operation, the result at step 601 is negative and the routine goes to step 602. Here, the count value (n) is not "0" and is a certain value so that an extra amount (dTAU) added to a required amount of fuel injected, determined on the basis of the engine speed, the engine load, and the engine temperature is calculated according to the following expression (3).

$$dTAU = k3 \left( c*n - q \sum_{i=1}^{n-1} i \right) \quad (3)$$

In the expression (3), $$\left( c*n - q \sum_{i=1}^{n-1} i \right)$$

represents the hatched area in the time chart shown in FIG. 15. The extra amount (dTAU) is this area multiplied by a predetermined coefficient (k3). Accordingly, the longer the fuel cut period becomes or the larger the increasing value (c) of the valve overlap period becomes, the larger the extra amount (dTAU) calculated becomes. When the fuel cut period is long or when the valve overlap period is long, fuel stuck to the inside wall of the intake port evaporates considerably due to the sufficient heating of the intake port before fuel injection starts. The extra amount (dTAU) surely compensates for the amount of fuel evaporated from the inside wall of the intake port so that a required amount of fuel can be fed to the combustion chamber 1 when the fuel injection starts. When the normal fuel injection is carried out during an intake stroke, the extra amount (dTAU) of fuel may be injected separately during an exhaust stroke.

In the previous embodiments, the variable valve timing mechanism can vary the valve overlap period continuously. However, it is clear that the present invention can be realized by a variable valve timing mechanism which varies the valve overlap period in stages.

In the main routine, any of six sub-routines can be carried out. Any more than one of the sub-routines may be carried out in series. Moreover, the fifth or the sixth sub-routine is carried out during an idle condition. However, it should be understood that these two sub-routines are effective when the engine has not warmed up, in spite of the degree of opening of the throttle valve.

Although the invention has been described with reference to specific embodiments thereof, it should be apparent that numerous modifications can be made thereto by those skilled in the art, without departing from the basic concept and scope of the invention.

I claim:

1. A valve timing control device for an internal combustion engine comprising:

a variable valve timing mechanism capable of varying the valve overlap period continuously or in stages;

stop means for stopping fuel injection in at least one predetermined engine operating condition;

determination means for determining an optimal value of the valve overlap period in a current engine operating condition, on the basis of current engine speed, load, and temperature;

control means for controlling said variable valve timing mechanism such that the valve overlap period becomes larger than said optimal value when fuel injection is stopped by said stop means.

2. A valve timing control device according to claim 1, wherein said control means controls said variable valve timing mechanism such that the higher the temperature in the combustion chamber becomes immediately before the fuel injection is stopped, the larger the valve overlap period becomes.

3. A valve timing control device according to claim 1, wherein said control means controls said variable valve timing mechanism such that the valve overlap period, which is larger than said optimal value, is gradually reduced when the fuel injection is stopped.

4. A valve timing control device according to claim 1, further comprising determination means for determining the extra amount of fuel added to the required amount of fuel injected when the fuel injection starts again, on the basis of the fuel injection stopped period and of the valve overlap period when the fuel injection is stopped.

* * * * *